United States Patent [19]

Yasuda et al.

[11] Patent Number: 5,122,790
[45] Date of Patent: Jun. 16, 1992

[54] LIQUID CRYSTAL PROJECTION APPARATUS AND DRIVING METHOD THEREOF

[75] Inventors: Shuuhei Yasuda; Nobuyoshi Nagashima, both of Nara, Japan

[73] Assignee: Sharp Kabushiki Kaisha, Osaka, Japan

[21] Appl. No.: 378,759

[22] Filed: Jul. 12, 1989

[30] Foreign Application Priority Data

Jul. 15, 1988 [JP] Japan ................... 63-177491

[51] Int. Cl.⁵ .................. G09G 3/36; G02F 1/01
[52] U.S. Cl. .................. 340/784; 340/716; 340/781; 358/236; 358/241; 359/55
[58] Field of Search ........... 340/784, 781, 716; 350/332, 333, 335; 358/235, 241, 230

[56] References Cited

U.S. PATENT DOCUMENTS 4,635,127 1/1987 Togashi ................ 358/236
4,906,071 3/1990 Takahara et al. ........... 350/335

FOREIGN PATENT DOCUMENTS 0241562 10/1986 European Pat. Off. .
2159314 11/1985 United Kingdom .
2162674 2/1986 United Kingdom .
2177841 1/1987 United Kingdom .

OTHER PUBLICATIONS

The abstract of Japanese Patent Application 60-169827, *Patent Abstracts of Japan*, vol. 10, No. 15, pub. Jan. 21, 1986, p. 422.

*Primary Examiner*—Alvin E. Oberley
*Assistant Examiner*—Chanh Nguyen

[57] ABSTRACT

A liquid crystal projection apparatus includes first, second and third liquid crystal display panels, first, second and third liquid crystal display panel driving circuits and a control circuit. The liquid crystal projection apparatus projection apparatus projects and displays pictures of the first, second and third liquid crystal display panels superimposing them on a screen. Each of the first, second and third liquid crystal display panel driving circuits applies driving voltages based on display data to scanned liquid crystal portions in the corresponding liquid crystal display panel. The driving voltages are inverted in polarity for every horizontal scanning period and also for every frame. In addition, at least one of the first, second and third liquid crystal display panels receives driving voltages of opposite polarities with respect to the remaining two panels.

8 Claims, 7 Drawing Sheets

(a) PANEL 1

|    | FI1 | FI2 | FI3 | FI4 | FI5 |
|----|-----|-----|-----|-----|-----|
| G1 | −   | +   | +   | −   | −   |
| G2 | +   | +   | −   | −   | +   |
| G3 | +   | −   | −   | +   | +   |
| G4 | −   | −   | +   | +   | −   |
| G5 | −   | +   | +   | −   | −   |

FIG. 7 (b) PANEL 2

|    | FI1 | FI2 | FI3 | FI4 | FI5 |
|----|-----|-----|-----|-----|-----|
| G1 | +   | −   | −   | +   | +   |
| G2 | −   | −   | +   | +   | −   |
| G3 | −   | +   | +   | −   | −   |
| G4 | +   | +   | −   | −   | +   |
| G5 | +   | −   | −   | +   | +   |

FIG. 7 (c) PANEL 3

|    | FI1 | FI2 | FI3 | FI4 | FI5 |
|----|-----|-----|-----|-----|-----|
| G1 | +   | +   | −   | −   | +   |
| G2 | −   | +   | +   | −   | −   |
| G3 | −   | −   | +   | +   | −   |
| G4 | +   | −   | −   | +   | +   |
| G5 | +   | +   | −   | −   | +   |

+ DISPLAY VOLTAGE SIGNAL OF POSITIVE POLARITY APPLIED TO A LIQUID CRYSTAL PICTURE ELEMENT

− DISPLAY VOLTAGE SIGNAL OF NEGATIVE POLARITY APPLIED TO A LIQUID CRYSTAL PICTURE ELEMENT

FIG.8

LIQUID CRYSTAL PROJECTION APPARATUS AND DRIVING METHOD THEREOF

BACKGROUND OF THE INVENTION

1. Field of the Invention

The present invention relates generally to a liquid crystal projection apparatus, and more specifically, to a liquid crystal projection apparatus which comprises a plurality of active matrix-type liquid crystal display panels or liquid crystal display panels of a simple matrix time division driving type, and projects and displays pictures of those display panels in such a manner that they are superimposed on a screen. The present invention also relates to a driving method of such a liquid crystal projection apparatus.

2. Description of the Background Art

Figure 1:
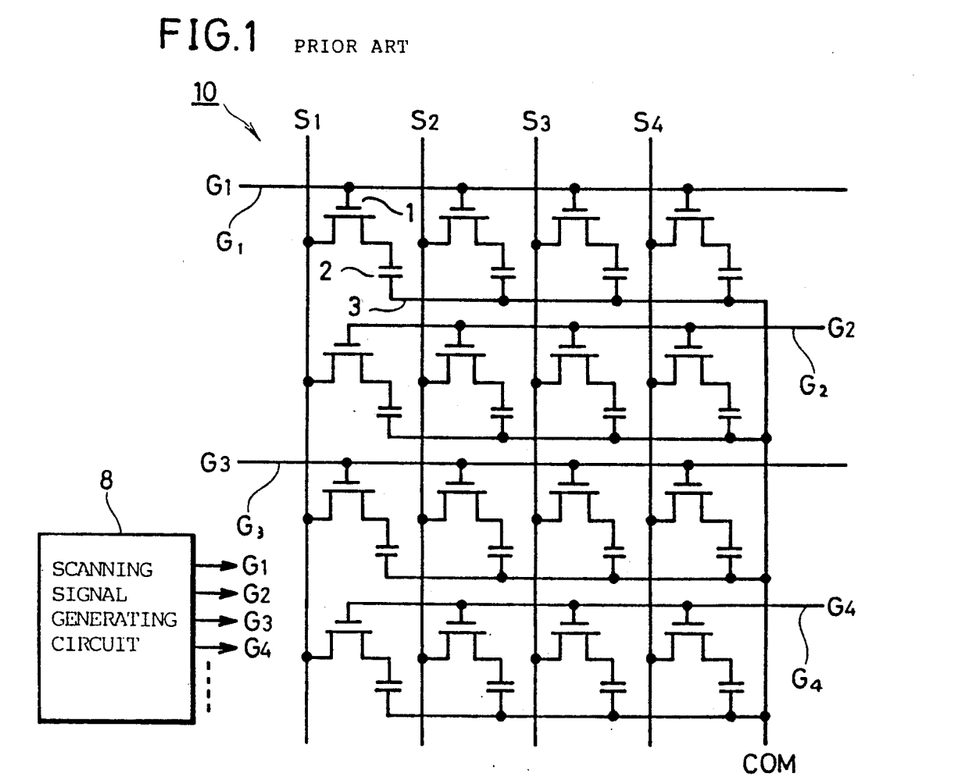
FIG. 1 is an equivalent circuit diagram showing a structure of a liquid crystal display panel.

FIG. 1 is a typical circuit diagram showing a structure of a general active matrix type liquid crystal display panel.

As shown in FIG. 1, in a liquid crystal display panel 10, a plurality of source lines $S_1$ to $S_4$ and a plurality of gate lines $G_1$ to $G_4$ are arranged intersecting with each other, and a thin film transistor 1 and a liquid crystal picture element 2 are provided at the respective intersections thereof. More specifically, one electrode of a liquid crystal picture element 2 is connected to a source line $S_1$ through a thin film transistor 1, a gate of which is connected to a gate line $G_1$. Similarly, the other picture elements are connected to the corresponding source lines through the thin film transistors, the gates of which are connected to the corresponding gate lines. The counter electrodes 3 of all the liquid crystal picture elements 2 receive common counter electrode signals COM. corresponding to a data signal. From a scanning signal generating circuit 8, gate signals $G_1$ to $G_4$ corresponding to vertical synchronizing signals are applied to the gate lines $G_1$ to $G_4$. The gate lines $G_1$ and $G_3$ correspond to the odd lines of TV signals and the gate lines $G_2$ and $G_4$ correspond to the even lines of the same. Meanwhile, a liquid crystal picture element 2 is equivalently shown as a capacitor.

Figure 2:
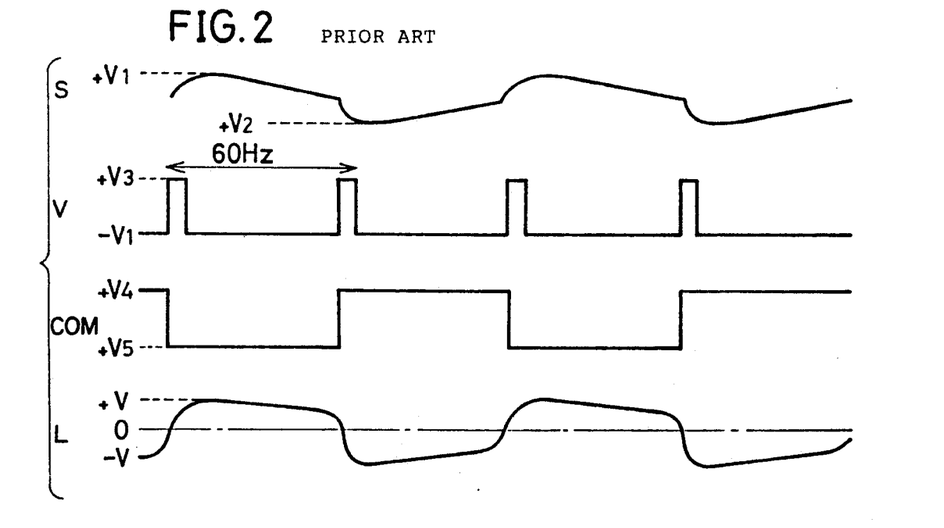
FIG. 2 is a diagram showing general voltage waveforms applied to liquid crystal display panels in a conventional liquid crystal projection apparatus.

FIG. 2 is a voltage waveform diagram showing an example of signal voltages applied to each portion of the liquid crystal display panel shown in FIG. 1.

S represents an analog sample and hold signal corresponding to a video signal voltage, V represents a vertical synchronizing signal, COM represents a counter electrode signal applied to a common counter electrode 3 of a liquid crystal picture element 2 and L represents a display voltage signal applied to a liquid crystal picture element 2 when the aforementioned signals have been applied thereto. Therefore, voltage signals of the same polarity are also applied to the other liquid crystal picture elements corresponding to the video signal voltages.

In an odd field, a scanning signal (a line sequential pulse signal based on a horizontal synchronizing signal) drives the gate lines $G_1$ and $G_3$ sequentially, and data signal voltages are applied to the liquid crystal picture elements through the source lines $S_1$ to $S_4$. At this moment, the gate lines $G_2$ and $G_4$ are in the off state. In an even field, the gate lines $G_2$ and $G_4$ are sequentially driven by a scanning signal as in the odd field, and data signal voltages are applied to the liquid crystal picture elements through the source lines $S_1$ to $S_4$. At this moment, the gate lines $G_1$ and $G_3$ are in the off state and the data signals in the odd fields are held. Then the polarities of the applied data signals are inverted for every frame and the liquid crystal picture elements are driven sequentially.

In FIG. 2, it is assumed that an analog sample and hold signal S applied to source lines fluctuates in the voltage range of $+V_1$ to $+V_2$. Counter electrode signals COM of $+V_4$ and $+V_5$ voltages are applied to the common counter electrodes of the liquid crystal picture elements alternatingly on a field-to-field basis. Therefore, the voltages of display voltage signals L applied to the liquid crystal picture elements are either $+V=V_1-V_5$ or $-V=V_2-V_4$ ($V_2<V_4$) for each field.

In connection with general TV pictures displayed by an interlace scanning method, when a conventional liquid crystal projection apparatus, in which general active matrix-type liquid crystal display panels are driven by field inversion, or frame inversion is employed, the driving frequency of the liquid crystal picture elements is equal to one half of the frame frequency or 15 Hz in case of TV signals of NTSC system. Therefore, a distribution in the spectrum of optical responses can be seen, which has a basic spectrum of 30 Hz or 15 Hz, which may cause flickers preventing practical use of the apparatus.

SUMMARY OF THE INVENTION

An object of the present invention is to provide a liquid crystal projection apparatus without any flickers.

Another object of the present invention is to provide an driving method of a liquid crystal projection apparatus capable of inhibiting occurrence of flickers.

A liquid crystal projection apparatus according to the present invention comprises a plurality of liquid crystal display panels having a plurality of liquid crystal portions arranged in a matrix, in which pictures obtained through a plurality of liquid crystal display panels based on display data are projected and displayed in such a manner that they are superimposed on a screen. The present apparatus comprises a scanning device which scans a plurality of liquid crystal portions of each liquid crystal display panel and a driving device which applies a driving voltage corresponding to display data to each liquid crystal portion scanned by the scanning device. The driving device performs control in such a manner that the driving voltage applied to the liquid crystal portions are inverted not only for every horizontal scanning period, but also for every frame comprising an odd field and an even field, and that at least one liquid crystal display panel receives a driving voltage of the opposite polarity with respect to the remaining panels.

According to a liquid crystal projection apparatus of the present invention, the driving voltages applied to the respective liquid crystal portions are inverted not only for every horizontal scanning period but for every frame, and at least one of a plurality of liquid crystal display panels receives a driving voltage of the opposite polarity with respect the remaining panels.

This permits the frequency of our optical response spectrum of pictures displayed on a projection screen to be over the field frequency so that occurrence of flickers is prevented.

BRIEF DESCRIPTION OF DRAWINGS

FIG. 7(a), (b) and (c) are diagrams showing polarities of display voltage signals applied to liquid crystal picture elements of first, second, and third liquid crystal display panels, respectively.

DESCRIPTION OF THE PREFERRED EMBODIMENT

In the following, details of an embodiment of the present invention will be described with reference to the accompanying drawings.

Figure 3:
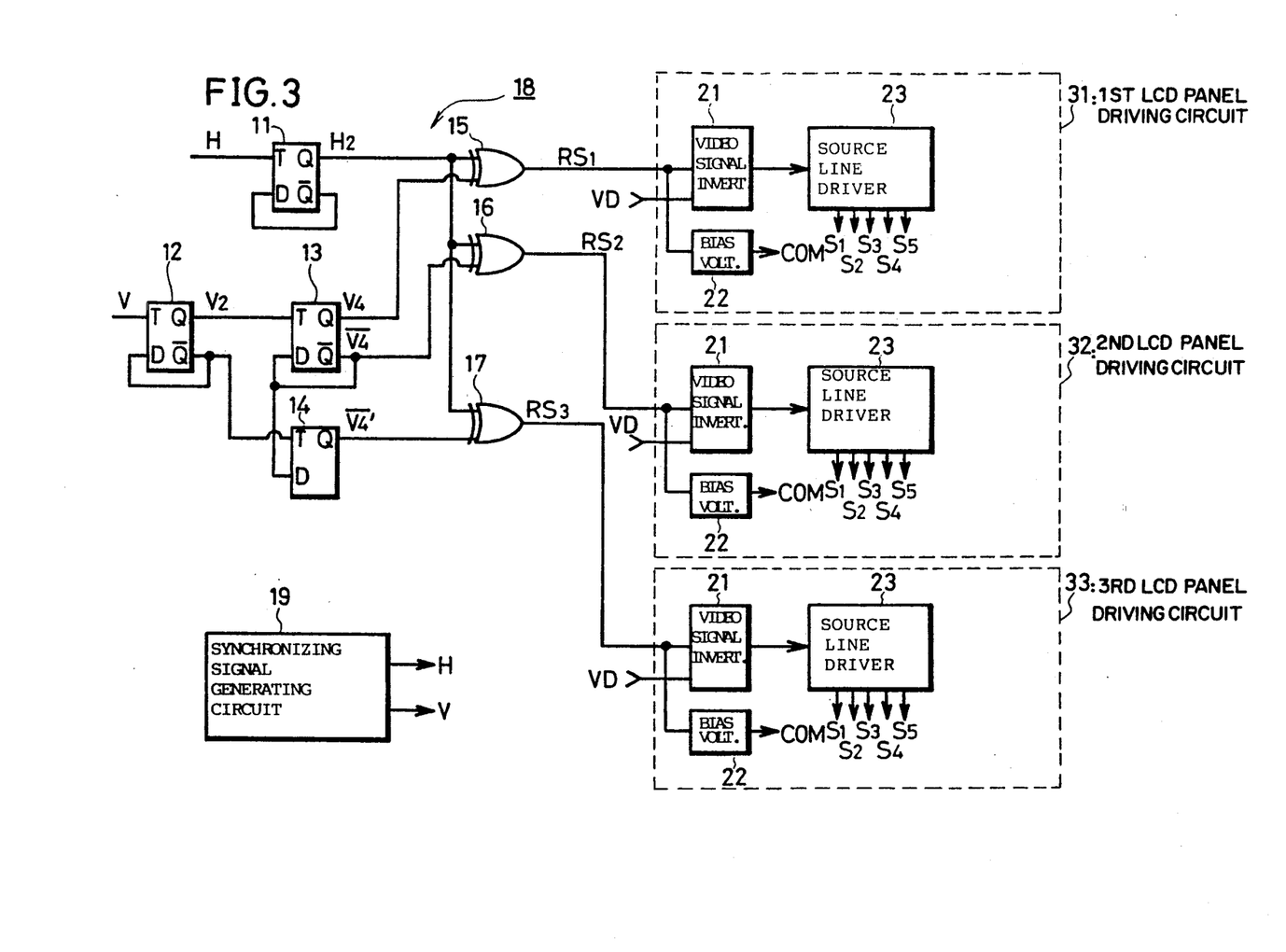
FIG. 3 is a circuit diagram showing a structure of a liquid crystal projection apparatus according to an embodiment of the present invention.

FIG. 3 is a circuit diagram showing a structure of a liquid crystal projection apparatus according to an embodiment of the present invention.

In FIG. 3, a control circuit 18 includes flip-flops 11 to 14. A clock terminal T of the flip-flop 11 receives a horizontal synchronizing signal H from a synchronizing signal generating circuit 19. The flip-flop 11 frequency-divides the horizontal synchronizing signal H and outputs a ½ frequency-divided signal H2 at an output terminal Q. On the other hand, a clock terminal T of the flip-flop 12 receives a vertical synchronizing signal V from a synchronizing signal generating circuit 19. The flip-flop 12 frequency-divides the vertical synchronizing signal V and outputs a ½ frequency-divided signal V2 at an output terminal Q. The flip-flop 13 further frequency-divides the ½ frequency-divided signal V2 and outputs a ¼ frequency-divided signal V4 at an output terminal Q, while outputting a ¼ invert frequency-divided signal $\overline{V4}$ at an invert output terminal $\overline{Q}$. In the flip-flop 14, a clock terminal T receives an output from an invert output terminal $\overline{Q}$ of the flip-flop 12 and a data terminal D receive the ¼ invert frequency-divided signal $\overline{V4}$ outputted from the flip-flop 13. The flip-flop 14 outputs a ¼ invert frequency-divided signal $\overline{V4}'$ which is delayed by one field as compared with the ¼ invert frequency-divided signal $\overline{V4}$ at the output terminal Q. One input terminal of respective Exclusive OR gates (referred to as ExOR gate hereinafter) 15, 16 and 17 receives the ½ frequency-divided signal H2 from the flip-flop 11. The other input terminal of the ExOR gate 15 receives the ¼ invert frequency-divided signal V4 from the Flip-flop 13. The other input terminal of the ExOR gate 16 receives the ¼ invert frequency-divided signal $\overline{V4}$ from the flip-flop 13. The other input terminal of the ExOR gate 17 receives the ¼ invert frequency-divided signal $\overline{V4}'$ from the flip-flop 14. The outputs of the ExOR gates 15, 16 and 17 are applied to first to third liquid crystal display panel driving circuits 31 to 33 as polarity inverting signals RS1, RS2 and RS3, respectively.

Figure 4:
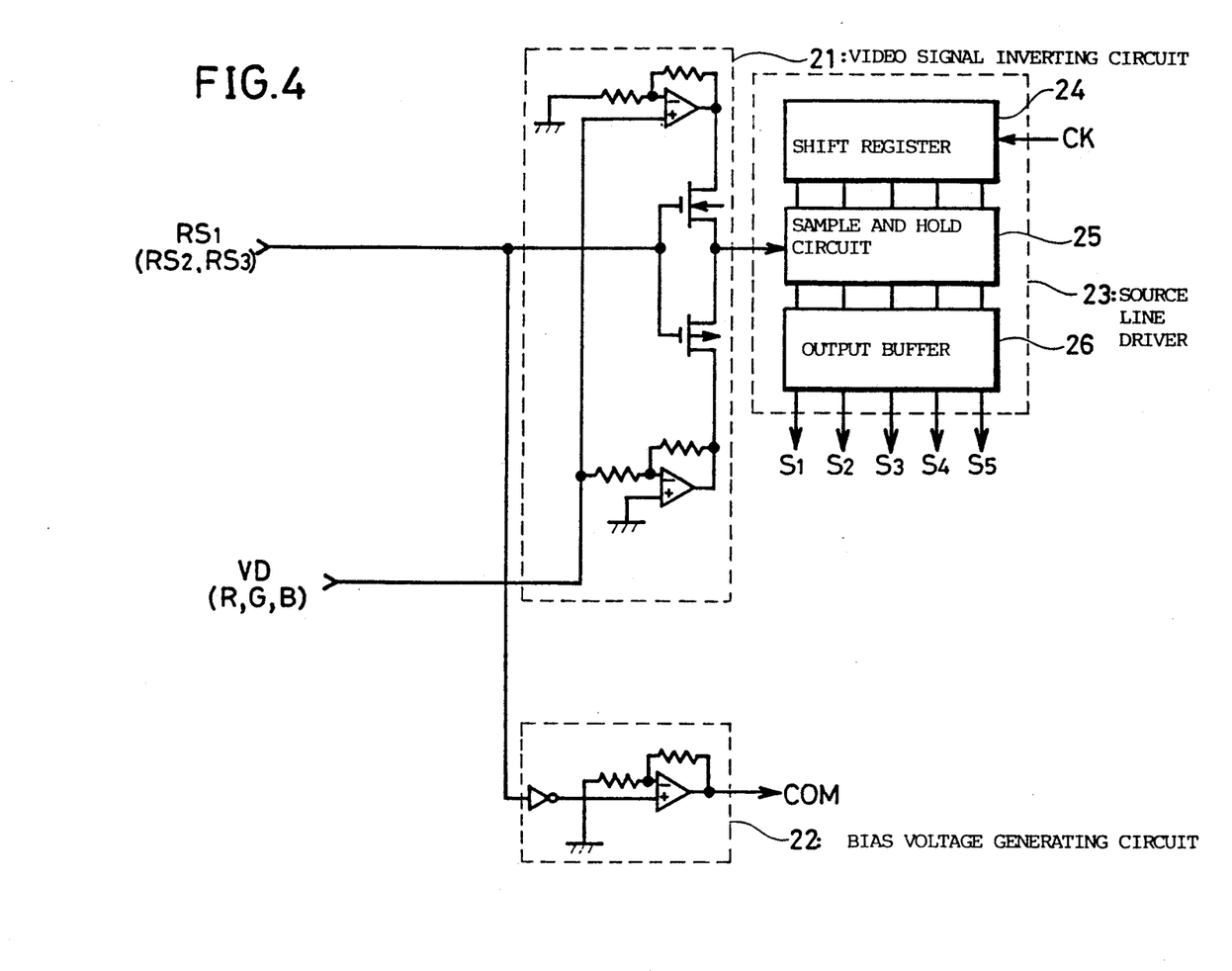
FIG. 4 is a circuit diagram showing a structure of a liquid crystal display panel driving circuit included in the liquid crystal projection apparatus shown in FIG. 3.

The first to third liquid crystal display panel driving circuits 31 to 33 each comprises a video signal inverting circuit 21, a bias voltage generating circuit 22 and a source line driver 23. FIG. 4 shows a circuit diagram of the first liquid crystal display panel driving circuit 31. The second and third liquid crystal display panel driving circuits 31 and 3 are constructed in the same manners in the first circuit. The video signal inverting circuit 21 is responsive to a polarity inverting signal RS1 for applying a signal voltage of the same or opposite polarity with respect to the polarity of a video signal VD to a sample and hold circuit 25 in the source line driver 23. Meanwhile, the bias voltage generating circuit 22 is responsive to the polarity inverting signal RS1 for generating a counter electrode signal COM. A shift register 24 is responsive to a start pulse CK for permitting the sample and hold circuit 25 to sequentially sample and hold voltage signals corresponding to source line $S_1$ to $S_4$ within a horizontal scanning period. The sample and hold circuit 25 provides, as source signals S, voltage signals sampled and held on source lines $S_1$ to $S_4$ for every horizontal scanning period.

Additionally, a first liquid crystal display panel is connected to the first liquid crystal panel driving circuit 31, a second liquid crystal display panel to the second liquid crystal display panel driving circuit 32 and a third liquid crystal display panel to the third liquid crystal display panel driving circuit 33. The first to third liquid crystal display panels are each constructed in the same way as in the liquid crystal display panel 10 shown in FIG. 1.

Gate lines $G_1$ to $G_4$ of the respective liquid crystal display panels receive gate pulses sequentially for every horizontal scanning period. As a result, a source signal S and a counter electrode signal COM are applied to the opposite electrodes of each liquid crystal picture element on every horizontal line.

Figure 5:
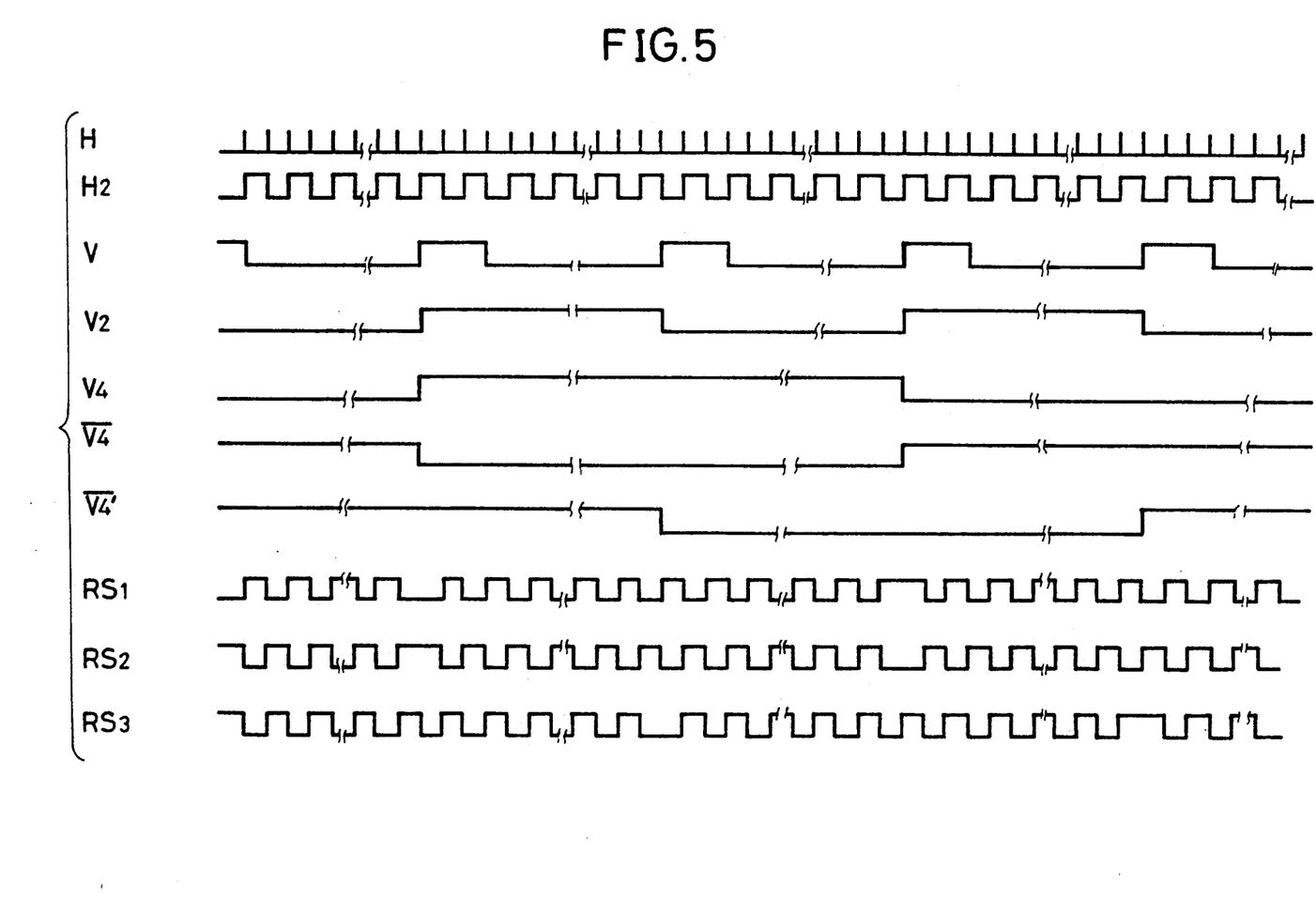
FIG. 5 is a timing chart showing signal waveforms in each portion of the liquid crystal projection apparatus shown in FIG. 3.

FIG. 5 is a timing chart showing signal waveforms in each portion of the liquid crystal projection apparatus shown in FIG. 3.

As shown in FIG. 5, a ½ frequency-divided signal H2 can be obtained by frequency-dividing a horizontal synchronizing signal H. A ½ frequency-divided signal V2 can also be obtained by frequency-dividing a vertical synchronizing signal V and is further-divided so that a ¼ frequency-divided signal V4 and a ¼ invert frequency-divided signal $\overline{V4}$ as an inverted signal thereof are obtained. In addition, a ¼ frequency-divided signal $\overline{V4}'$ is obtained which is delayed by one field period as compared with the ¼ invert frequency-divided signal $\overline{V4}$.

Through operation of an exclusive logic sum of a ½ frequency-divided signal H2 and a ¼ frequency-divided signal V4, a polarity inverting signal RS1 to be applied to a first liquid crystal display panel driving circuit 31 can be obtained. Through operation of an exclusive logic sum of a ½ frequency-divided signal H2 and a ¼ frequency-divided signal V4, a polarity inverting signal RS2 to be applied to a second liquid crystal display panel driving circuit 32 can be obtained. Furthermore, through operation of an exclusive logic sum of a ½ frequency-divided signal H2 and a ¼ frequency divided signal $\overline{V4}$, a polarity inverting signal RS3 to be applied to a liquid crystal display panel driving circuit 33 can be obtained.

The polarity inverting signals RS1 and RS2 are opposite to each other in polarity.

The polarity inverting signal RS3 exhibits alternatingly, the same or opposite polarity with respect to the polarity inverting signal RS1 on a field-to-field basis, and vice versa with respect to the polarity inverting signal RS2. Therefore, display voltage signals, polarities of which are inverted not only for every horizontal scanning period but for every frame, are applied to the respective liquid crystal picture elements of first to third liquid crystal display panels, while the display-voltage signals applied to the respective picture elements of one liquid crystal display panel have the opposite polarities with respect to the display voltage signals applied to the respective picture elements of the remaining two liquid crystal display panels.

Figure 6:
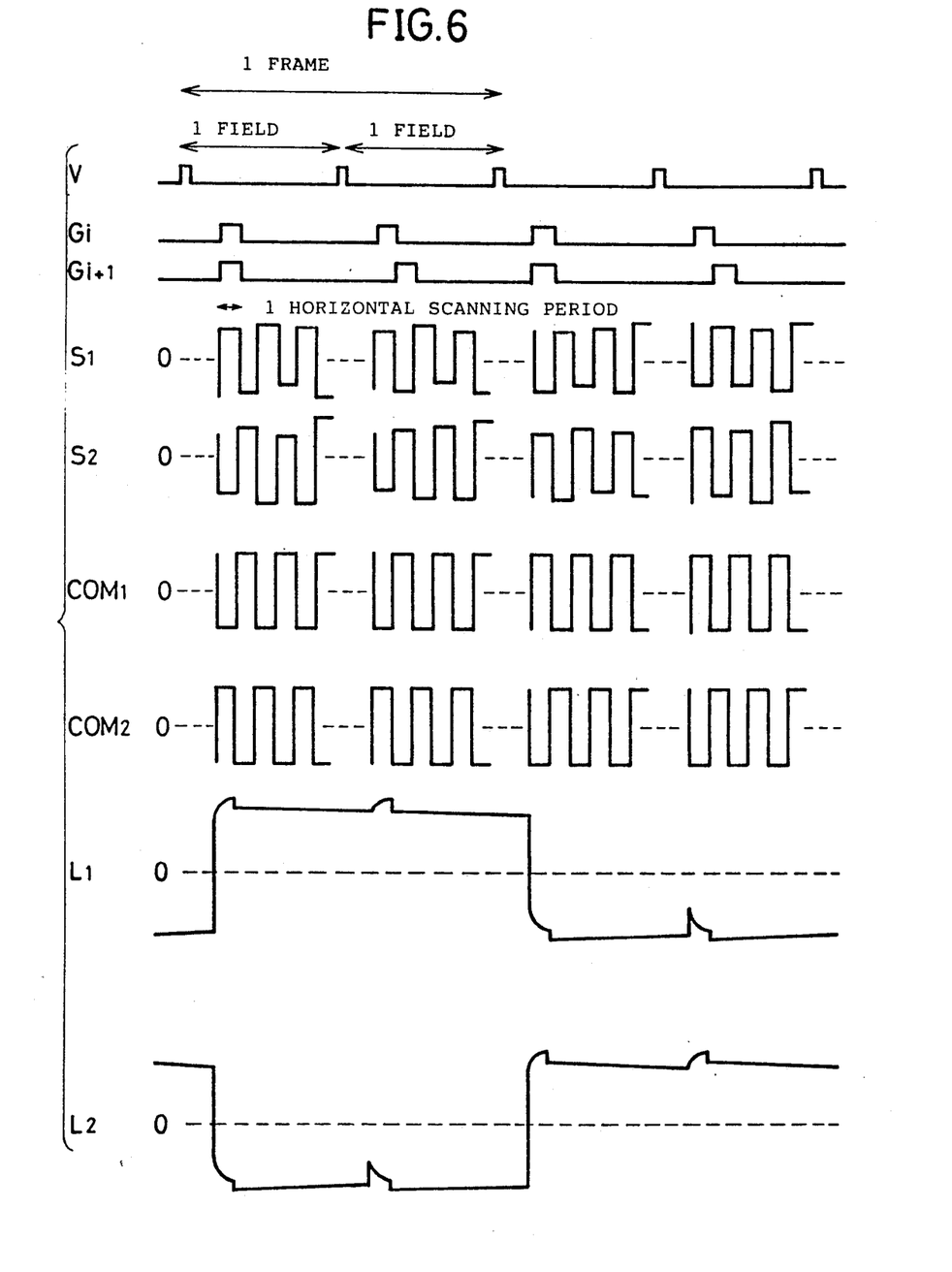
FIG. 6 is a diagram showing voltage waveforms applied to liquid crystal picture elements of first and second liquid crystal display panels.

FIG. 6 is a diagram showing waveforms of voltage signals applied to the respective one of the liquid crystal picture elements of first and second liquid crystal display panels.

V represents a vertical synchronizing signal of 60 Hz in frequency. $G_i$ represents a gate signal of an odd line (i-th line), $G_{i+1}$ a gate signal of an even line ((i+1)-th line). $S_1$ represents a source signal applied to one of the source lines in a first liquid crystal display panel and $S_2$ represents a source signal applied to one of the source lines in a second liquid crystal display panel. The polarities of source signals $S_1$ and $S_2$ are inverted for every frame frequency as well as for every horizontal scanning period. In addition, the polarities of the source signal $S_1$ applied to the first liquid crystal display panel and the second source signal $S_2$ applied to the second liquid crystal display panel differ from each other. In a liquid crystal display panel for displaying with the normally white characteristics, means for enhancing contrast by applying a bias voltage of the opposite polarity with respect to the corresponding source signal to the counter electrode is employed. COM1 represents a counter electrode signal applied to a counter electrode in a first liquid crystal display panel, COM2 represents a counter electrode signal applied to a counter electrode in a second liquid crystal display panel. Theses counter electrode signals COM1 and COM2 are generated from the respective bias voltage generating circuit 22 (see FIG. 3 and FIG. 4). As shown in FIG. 6, the counter electrode signal COM1 has the opposite polarity with respect to the source signal $S_1$ and the counter electrode signal COM2 has the opposite polarity with respect to the source signal $S_2$.

Furthermore, 11 represents a display voltage signal applied to one of the liquid crystal picture elements in a first liquid crystal display panel and L2 represents a display voltage signal applied to one of the liquid crystal picture elements in a second liquid crystal display panel. In the first liquid crystal display panel, when a gate signal Gi attains and continues the high level during one horizontal synchronizing period, thin film transistors on the corresponding horizontal line are turned on so that a source signal $S_1$ is applied to one electrode of a liquid crystal picture element and at the same time a counter electrode signal COM1 is applied to the counter electrode. Therefore, the display voltage signal L1 is a difference signal equal to the source signal $S_1$ minus the counter electrode signal COM1. This display voltage signal L1 is held for one frame period and exhibits the opposite polarity in the next frame period.

Similarly, the display voltage signal L2 applied to liquid crystal picture elements of the second display panel is a difference signal equal to the source signal S2 minus the counter electrode signal COM2. This display voltage signal is also held for one frame period and exhibits the opposite polarity in the next period. The display voltage signal L1 applied to liquid crystal picture elements of the first liquid crystal display panel and the display panel signal L2 applied to liquid crystal picture elements of the second liquid crystal display panel have the opposite polarities to each other. Thus, the first and second liquid crystal display panels are driven by voltages of the opposite polarities to each other.

Figure 7:
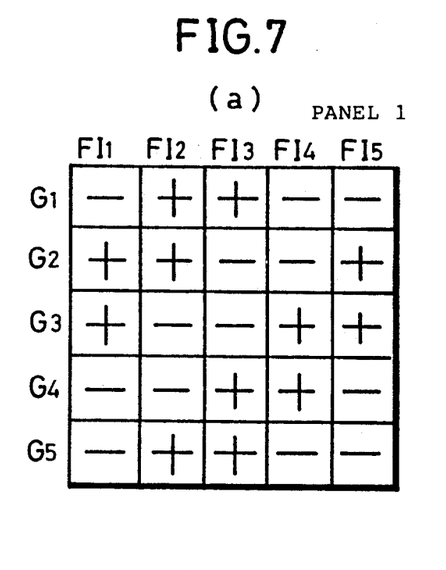

FIG. 7(a) to (c) are diagrams showing the operating polarities of the first to third liquid crystal display panels driven by the liquid crystal projection apparatus shown in FIG. 3.

In FIG. 7(a) to (c), the operating polarities of liquid crystal picture element columns corresponding to gate lines $G_1$ to $G_5$ are shown on a field-to-field basis. FI1 to FI5 represent fields 1 to 5, respectively. The sign of "+" represents a display voltage signal of positive polarity applied to liquid crystal picture elements on the respective horizontal lines and the sign of "−" represents a display voltage signal of negative polarity applied to liquid crystal picture elements on the respective horizontal lines. In the present case, all the gate lines are sequentially scanned with two adjacent lines at a time, while combination of the two adjacent lines is shifted by one line for every field. More specifically, for example, in a first field, gate lines $G_1$ and $G_2$ are regarded as a first pair and gate lines $G_3$ and $G_4$ as a second pair. First, the gate lines $G_1$ and $G_2$ of the first pair are scanned simultaneously, and then the gate lines $G_3$ and $G_4$ of the second pair are scanned again simultaneously. In a second field, gate line $G_2$ and $G_3$ are regarded as a first pair and gate line $G_4$ and $G_5$ as a second pair. The gate lines $G_2$ and $G_3$ of the first pair are scanned simultaneously, thereafter the gate lines $G_4$ and $G_5$ of the second pair are scanned simultaneously. Such a scanning method as described above will be referred to as "different combination scanning" hereinafter.

In the first field 1, the second and third liquid crystal display panels have the same polarities with each other and the first liquid crystal display panel has the opposite polarities thereto. In the next field 2, the first and third liquid crystal display panels have the same polarities with each other and the second liquid crystal display panel has the opposite polarities thereto. In the third field 3, the second and third liquid crystal display panels have the same polarities with each other and the first liquid crystal display panel has the opposite polarities thereto. For the rest, the same is repeated sequentially.

Figure 8:
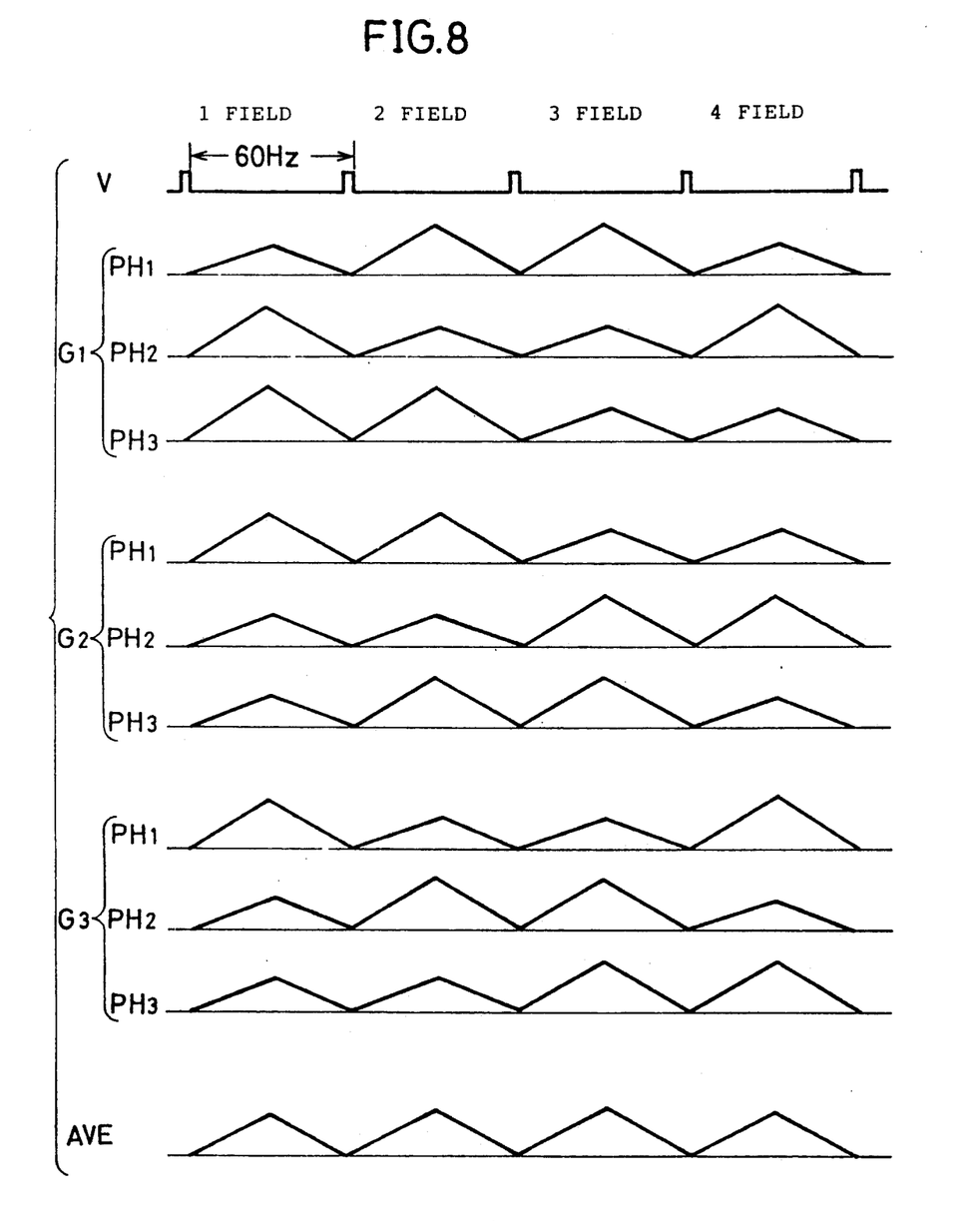
FIG. 8 is a waveform diagram showing optical response waveforms based on polarities of first, second and third liquid crystal display panels, respectively.

FIG. 8 is a diagram showing photo response waveforms based on the polarities of the first to third liquid crystal display panels shown in FIG. 7(a) to (c).

In FIG. 8, PH 1 to PH 3 represent photo response waveforms corresponding to the first to third liquid crystal display panels, respectively. The photo response waveforms shown in FIG. 8 correspond to the gate lines $G_1$ to $G_3$ In general, there can be seen difference of photo response between the display voltage signals of negative polarity and those of positive polarity, as shown in FIG. 8, due to asymmetry of voltage. AVE represents a photo response waveform shown as an average of photo response waveforms corresponding to the gate lines $G_1$ to $G_3$. As shown in FIG. 8, the photo response waveform AVE is a waveform of 60 Hz with an approximately uniform amplitude.

Thus, the pictures superimposed at display points on a projection screen through the respective liquid crystal display panels serve as display picture elements having their respective polarities. When two or more lines are observed in each field, no definite pattern of polarity can be seen. Instead, an averaged photo response waveform can be obtained. This enables a photo response spectrum of 60 Hz equal to the field frequency to be obtained.

As a result, the driving frequency of liquid crystal picture elements increases so that occurrence of flickers is prevented.

While a description has been made on a case in which the present invention is applied to "different combination scanning" of gate bus lines in TFT-LCD, it would be clearly understood that the present invention can be also applied to liquid crystal display panels of a simple matrix time division driving type as well as of a general interlace scanning type.

Furthermore, a liquid crystal projection apparatus according to the present invention can be employed as a terminal display apparatus of OA equipment such as a projection TV, an OHP (overhead projector) and the like.

As described in the foregoing, in the present invention, while driving voltages applied to the respective liquid crystal portions of liquid crystal display panels are inverted not only for every horizontal scanning period but for every frame, at least one of a plurality of liquid crystal display panels receives driving voltages of the opposite polarities to the remaining panels so that an optical spectrum projected and displayed on a screen includes a field frequency as a main component. As a result, a well-ordered optical response waveform with a field frequency can be obtained preventing occurrence of flickers.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal projection apparatus including a plurality of liquid crystal display panels having a plurality of liquid crystal portions arranged in a matrix, in which pictures obtained through the plurality of liquid crystal display panels based on display data are projected and displayed in such a manner that they are superimposed on a screen, comprising:

scanning means for scanning each of said plurality of liquid crystal portions in said plurality of liquid crystal display panels; and driving means for applying a driving voltage corresponding to display data, to each of the liquid crystal portions scanned by said scanning means;

said driving means performing control such that driving voltages to be applied to the liquid crystal portions are inverted in polarity for every horizontal scanning period and also for every frame comprising an odd field and an even field, and such that at least one of said plurality of liquid crystal display panels receives driving voltages of opposite polarities with respect to the remaining liquid crystal display panels.

2. The liquid crystal projection apparatus according to claim 1, wherein said driving means comprises:

a plurality of panel driving means, corresponding to said plurality of liquid crystal display panels, for sequentially applying driving voltages to columns of the liquid crystal portions in the corresponding liquid crystal display panel; and control means for controlling said plurality of panel driving means such that said driving voltages derived from each of said plurality of panel driving means are inverted in polarity for every horizontal scanning period and also for every frame, and such that driving voltages derived from at least one of said plurality of panel driving means have opposite polarities with respect to those of the driving voltage derived from the remaining panel driving means.

3. The liquid crystal projection apparatus according to claim 2, further comprising:

synchronizing signal generating means for generating a horizontal synchronizing signal and a vertical synchronizing signal, said control means being responsive to said horizontal synchronizing signal and said vertical synchronizing signal for applying a plurality of inversion indicating signals, indicative of inverting a driving voltage in polarity, to each of said plurality of panel driving means, each of said plurality of inversion indicating signals being inverted for every horizontal scanning period and also for every frame and at least one of said plurality of inversion indicating signals having an opposite polarity with respect to the remaining inversion indicating signals, and each of said plurality of panel driving means being responsive to the corresponding inversion indicating signal for inverting a driving voltage in polarity.

4. The liquid crystal projection apparatus according to claim 3, which further comprises:

synchronizing signals generating means for generating a horizontal synchronizing signal and a vertical synchronizing signal, said liquid crystal display panel including first, second and third crystal display panels, said plurality of panel driving means including first, second and third panel driving means, and said control means including, frequency-divided signal generating means, responsive to said horizontal synchronizing signal and said vertical synchronzing signal, for outputting a $\frac{1}{2}$ frequency-divided signal obtained by dividing said horizontal synchronizing signal into $\frac{1}{2}$ in frequency, a first $\frac{1}{4}$ frequency-divided signal obtained by dividing said vertical synchronizing signal into $\frac{1}{4}$ in frequency, a second $\frac{1}{4}$ frequency-divided signal, which is an inverted signal of said first $\frac{1}{4}$ frequency-divided signal, and a third $\frac{1}{4}$ frequency-divided signal delayed by one field period as compared with said second $\frac{1}{4}$ frequency-divided signal, first logic means for performing an exclusive logic sum operation on said $\frac{1}{2}$ frequency-divided signal and said second $\frac{1}{4}$ frequency-divided signal, and for applying the result thereof to said first panel driving means as a first inversion indicating signal, second logic means for performing an exclusive logic sum operation on said $\frac{1}{2}$ frequency-divided signal and said second $\frac{1}{4}$ frequency-divided signal, and for applying the result thereof to said second panel driving means as a second inversion indicating signal, and third logic means for performing an exclusive logic sum operation on said $\frac{1}{2}$ frequency-divided signal and said third $\frac{1}{4}$ frequency-divided signal, and for applying the result thereof to said third panel driving means as a third inversion indicating signal.

5. The liquid crystal projection apparatus according to claim 3, wherein each of said plurality of panel driving means comprises, signal inverting means, receiving a display signal corresponding to display data and being responsive to said inversion indicating signal, for outputting either an inverted signal or a non-inverted signal of said display signal; and line driving means for sequentially applying an output of said signal inverting means to columns of the liquid crystal portions in the corresponding liquid crystal display panel as a driving signal.

6. The liquid crystal projection apparatus according to claim 5, wherein each of said plurality of liquid crystal portions in said plurality of liquid crystal display panels has one and another electrodes, and each of said plurality of liquid crystal display panels further includes bias voltage generating means, responsive to said inversion indicating signal, for generating a bias voltage of an opposite polarity with respect to said driving voltage, said driving voltage being applied to said one electrode of said liquid crystal portion, said bias voltage being applied to said other another electrode of said liquid crystal portion.

7. The liquid crystal projection apparatus according to claim 6, wherein said line driving means comprises:

same and hold means for sampling and holding an output of said signal inverting means as a driving voltage;

selecting means for sequentially selecting driving voltages held by said sample and hold means; and buffer means for applying a driving voltage selected by said selecting means to the corresponding column of liquid crystal portions in the corresponding liquid crystal display panel.

8. A driving method of a liquid crystal projection apparatus including a plurality of liquid crystal display panels having a plurality of liquid crystal portions arranged in a matrix, in which pictures obtained through the plurality of first crystal display panels based on display data are projected and displayed in such a manner that they are superimposed on a screen, the method comprising the steps of;

interlace-scanning the plurality of liquid crystal portions in the plurality of liquid crystal display panels, applying driving voltages corresponding to display data to each of the scanned liquid crystal portions, and performing control such that the driving voltages to be applied to each of the liquid crystal portions are inverted in polarity for every horizontal scanning period and also for every frame comprising an odd field and an even field, and such that at least one of the plurality of liquid crystal display panels receives driving voltages of opposite polarities with respect to the remaining liquid crystal display panels.

* * * * *